US006651821B2

(12) United States Patent
Ratesic

(10) Patent No.: US 6,651,821 B2
(45) Date of Patent: Nov. 25, 2003

(54) TILTING PLATFORM CHECKWEIGHING DEVICE

(75) Inventor: Edward Ratesic, Library, PA (US)

(73) Assignee: Mettler-Toledo, Inc., Columbus, OH (US)

( * ) Notice: Subject to any disclaimer, the term of this patent is extended or adjusted under 35 U.S.C. 154(b) by 263 days.

(21) Appl. No.: 09/832,565

(22) Filed: Apr. 11, 2001

(65) Prior Publication Data

US 2001/0037960 A1 Nov. 8, 2001

Related U.S. Application Data

(60) Provisional application No. 60/197,465, filed on Apr. 17, 2000.

(51) Int. Cl.[7] .............................. B07C 5/16; G01G 13/00
(52) U.S. Cl. ........................ 209/592; 209/645; 209/921; 177/66; 177/145
(58) Field of Search ................. 209/515, 592, 209/593, 645, 646, 647, 648, 649, 650, 912, 916, 921; 177/145, 165, 66

(56) References Cited

U.S. PATENT DOCUMENTS

| 1,089,680 A | 3/1914 | Sloan et al. |
|---|---|---|
| 2,055,131 A | 9/1936 | Yogel-Jorgensen |
| 3,326,309 A | 6/1967 | Swearengen |
| 3,780,818 A | 12/1973 | Lumby et al. |
| 4,155,549 A | 5/1979 | Mims |
| 4,450,073 A * | 5/1984 | Burnett et al. .......... 209/593 X |
| 4,660,665 A | 4/1987 | Powell |
| 4,817,744 A | 4/1989 | Power |
| 5,101,982 A | 4/1992 | Gentili |
| 5,244,100 A | 9/1993 | Regier et al. |
| 5,294,004 A * | 3/1994 | Leverett ................. 177/145 X |
| 5,306,877 A | 4/1994 | Tas |
| 5,611,437 A | 3/1997 | Okada |
| 5,708,236 A | 1/1998 | Shaanan et al. |

* cited by examiner

Primary Examiner—Tuan N. Nguyen
(74) Attorney, Agent, or Firm—William L. Krayer

(57) ABSTRACT

A checkweighing station includes a weigh platform mounted on a load cell which in turn is mounted on a rotatable shaft so that the entire assembly can be rotated to tilt the platform in one direction for an acceptable weight of a weighed item and in another direction for a rejected weight or weight of a different catgegory. A memory device can determine a trend and make adjustments in a production process.

14 Claims, 5 Drawing Sheets

TILTING PLATFORM CHECKWEIGHING DEVICE

RELATED APPLICATION

This application claims the full benefit of Provisional Application Serial No. 60/197,465 filed Apr. 17, 2000 having the same title.

BACKGROUND OF THE INVENTION

There is a need for an efficient device for accepting or rejecting, by weight, similar articles that are delivered to a weighing device. In particular, there is a need for a system for checkweighing similar articles and containers which are to meet specified weight criteria, and separating, at the point of weighing, those that meet the criteria from those which do not.

A 1914 patent to Sloan and Barnes, U.S. Pat. No. 1,089,680, describes a weighing system for quality control of cigarettes based on weight, wherein the rate of manufacture is regulated according to whether the cigarettes are within specification. Drums are rotated for filling and discharge according to the weight of their contents, in Vogel-Jorgensen's U.S. Pat. No. 2,055,131.

A simple platform on a load cell is proposed by Lumby et al for weighing fowl, in U.S. Pat, No. 3,780,818. Mims, in U.S. Pat. No. 4,155,549, sorts heavier and lighter balls by combining a diverting plate with a pivotable weighing plate. A hopper is actuated by Okada for releasing objects heavier than a preset value, in U.S. Pat. No. 5,611,437. And, Shaanan et al, in U.S. Pat, No. 5,708,236, describe a cantilever beam for transmitting force, i.e. weight, to a strain gauge.

It is not uncommon to employ a weigh station in a production conveying line for determining whether the produced items are too heavy or too light, wherein the system automatically diverts an out-of-specification item from the conveying line at a point downstream from the weigh station. The actual weighing can take place as the item is moving or in a static condition, but in either case the diversion or separation typically is conducted at a point further removed from the weigh station. See, for example, Kvisgaard et al U.S. Pat, No. 5,998,740, Tokutu U.S. Pat, No. 5,383,561, Beauchemin et al U.S. Pat, No. 5,006,225, Rice et al U.S. Pat, No. 3,139,184, and Altenpohl et al U.S. Pat. No. 3,596,749.

I am not aware, however, of a system of the type described below, wherein an object is weighed on a weigh platform which itself is tilted immediately to divert the object when it is too heavy or too light.

SUMMARY OF THE INVENTION

My invention is useful in production lines, particularly those having a conveying system and wherein weight specifications are important. It is a checkweighing system wherein a newly produced or other item is placed, as by a robot arm, on a weigh platform, the item is weighed, and, if it is outside a desired weight range, the platform is tilted to cause the item to slide or fall into a bin or onto a diverting conveyor. My invention is quite versatile, in that the weigh interval or time, the speed of the tilt, and the degree of the tilt can be readily adjusted. My system will not only accept or reject the production items one at a time, but can discern trends and be used otherwise to adjust production practices.

DETAILED DESCRIPTION OF THE INVENTION

Figure 1:
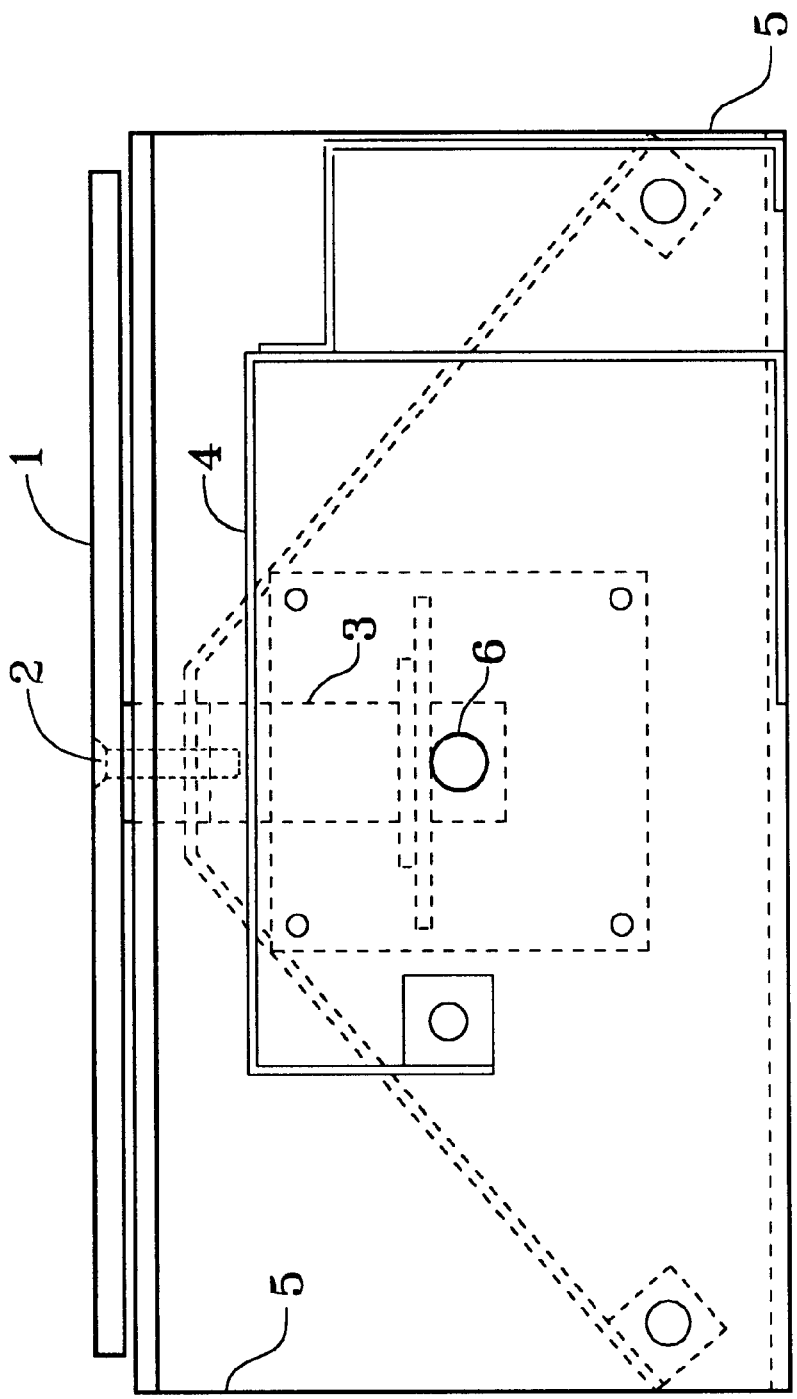
FIG. 1 is a more or less diagrammatic sectional view of my weigh station, showing the horizontal platform.

In FIG. 1, a platform 1 is fastened by bolt 2 to load cell beam 3 which contains a load cell not seen. Framework 4 and housing 5 support rotatable shaft 6, onto which the beam 3 is fixed.

Figure 2:
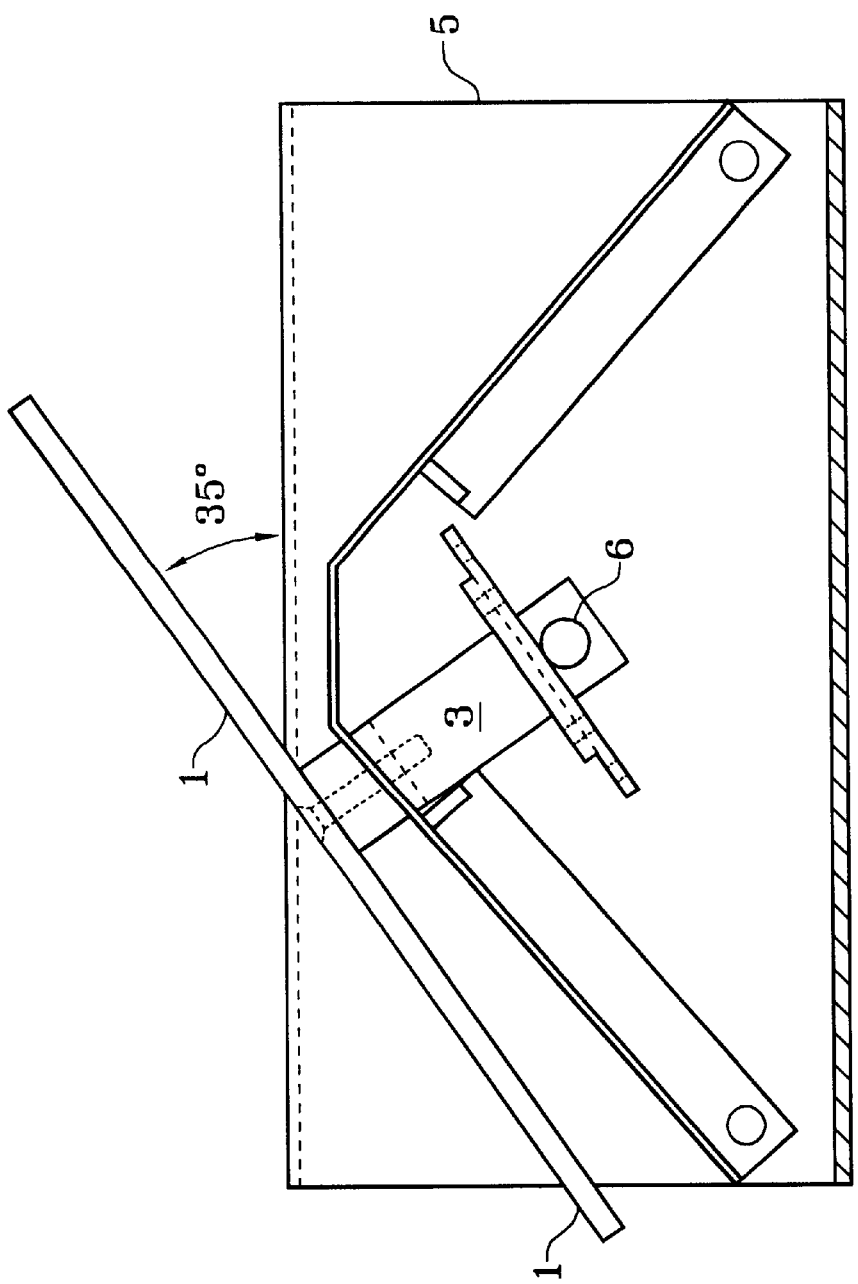
FIG. 2 is a view similar to that of FIG. 1, but with the platform tilted to reject an item.

FIG. 2 is a view similar to that of FIG. 1 except that the platform 1 has been tilted by rotating shaft 6, which also tilts beam 3. Rotation of shaft 6 and tilting of platform 1 enables the mechanism to reject an item on the platform 1. Rotation of shaft 6 and tilting of platform 1 is depicted for rejection, but a similar rotation and shifting in the other direction is performed for acceptable items. The appropriate direction is determined by the controller 10, seen in FIG. 4. When the item has been removed by gravity from the platform, the shaft is again rotated, in the opposite direction from that used for rejection or acceptance, and the platform is returned to the horizontal, ready to receive the next item, which will be placed on it by an arm or other mechanism not shown. For proper operation of contemporary load cells and load cell beams, the platform should be substantially horizontal, preferably within five arc minutes of horizontal. As indicated below, however, my invention contemplates the use of any load cell beam or direct weight (vertical force) load cell or strain gauge capable of accurately weighing an item on platform 1 and generating a signal representative of the weight of the item within a desired tolerance.

Figure 3:
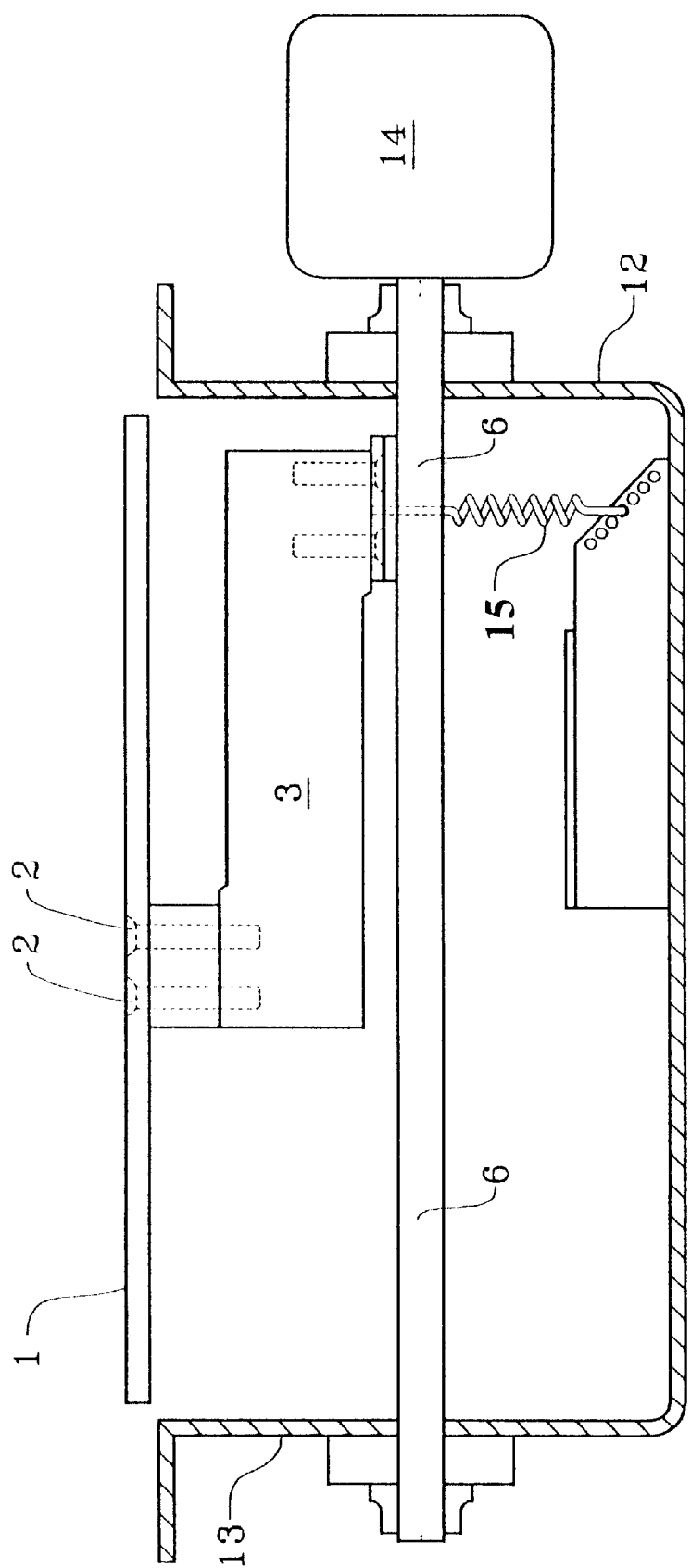
FIG. 3 shows a preferred construction of a platform, load cell beam, and rotatable shaft to which the load cell beam is fixed.

FIG. 3 reveals the preferred assembly of FIGS. 1 and 2 in a different sectional view. Here it is seen that platform 1 is fixed by bolts 2 to load cell beam 3 and load cell beam 3 is fixed to shaft 6. Shaft 6 may rotate in a bearing or collar in housing wall 12. Load cell beam 3 is fixed to shaft 6 so that it will turn with shaft 6 when it is turned by a motor 14 outside of housing wall 12. Shaft 6 may also be supported by housing wall 13, preferably in a bearing permitting easy rotation. Spring 15 helps to stabilize load cell beam 3. In this preferred configuration, the load cell beam 3 is a single point aluminum load cell model MT083286020 provided by Mettler-Toledo. The load cell or a similar construction may accommodate strain gauges of varying capacities, but in this type of load cell, the strain gauges are placed within the load cell beam 3 and calibrated so that variations in positioning of the items on the platform will not significantly affect the weight determination.

The load cell beam is of a type readily available commercially. The strain gauges within the load cell are positioned and calibrated to detect stress in the beam caused by the leverage of the weight at the platform and through the point of attachment to shaft 6. The load cell beam 3 is capable of weighing an item on the platform 1 and generating a signal representing the weight of the item. My invention utilizes this signal for comparison to a standard or set point to cause the platform 1 to be tilted in a predetermined direction when the item exceeds a predetermined weight or is under a predetermined minimum weight. If the item is within the acceptable limits the platform 1 is tilted in the other direction. When the platform 1 is tilted in either direction, the item descends into a bin or onto a conveyor for further handling.

Probably the most common load cell beam 3 of the type described has a capacity from 10 grams to 4000 grams, although other ranges are available—for example having maximum capacity of 1000 g, 3000 g, and 5000 g and being reliably accurate within varying tolerances such as 0.05 g, 0.1 g, and 0.2 g. I do not intend to be limited to such ranges and accuracies, as the principle of my invention is clearly applicable to other ranges and accuracies.

Figure 4:
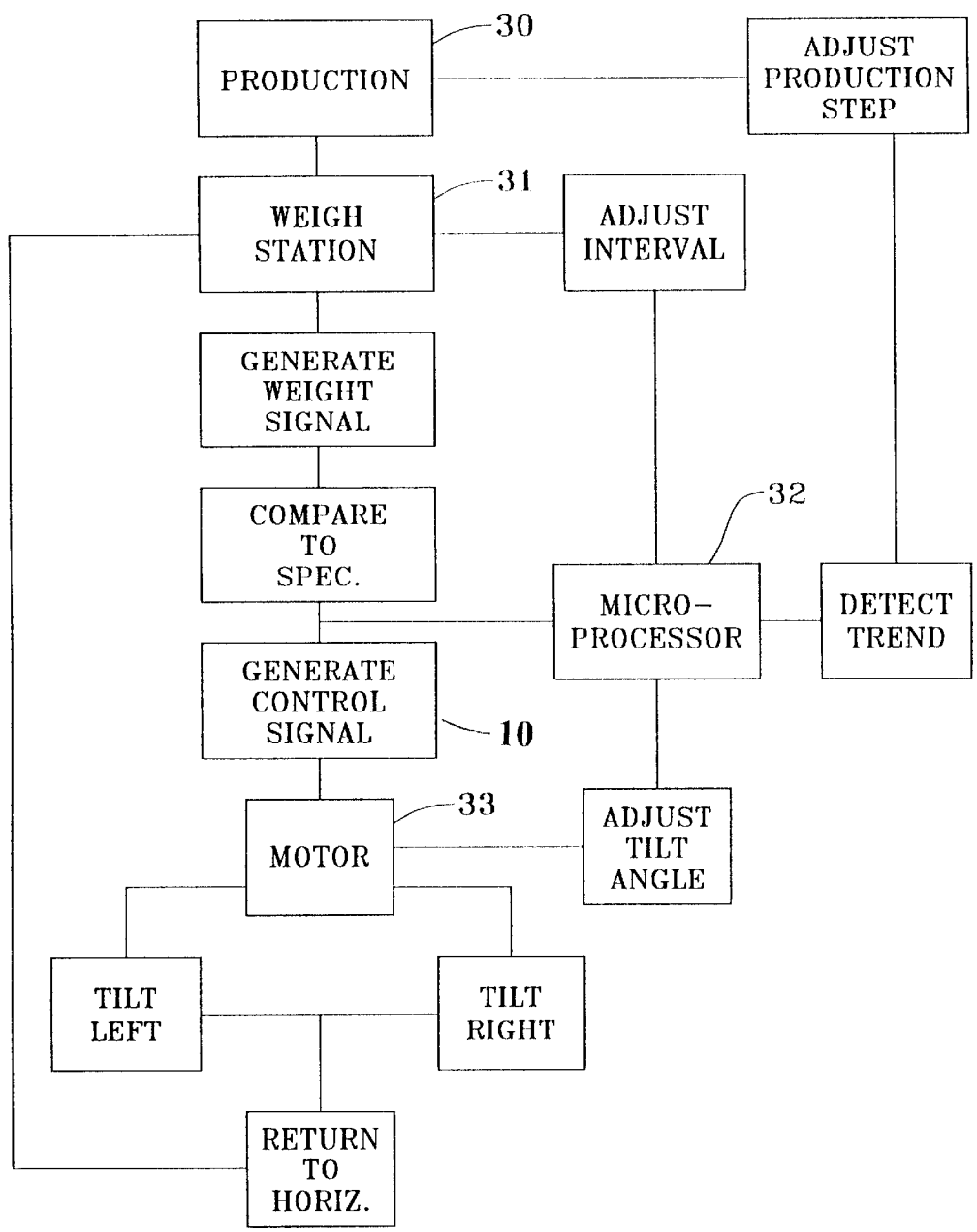
FIG. 4 is a flow sheet or logic diagram showing the overall process followed by a preferred version of my invention.

FIG. 4 is a flow sheet showing the logic of the system, which may be accomplished with various types of control systems known in the art. In the ideogrammatic flow sheet of FIG. 4, a production area 30 or other source provides items to be checked for quality control. The items are moved onto weigh station 31 by a mechanical arm (not shown) or other suitable device, where they are weighed. Weigh station 31 is preferably designed as illustrated in FIGS. 1–3 or 5, and generates an electrical signal as a function of the weight of the item. Comparison of the weight may be performed in a simple comparator having a set point or may be done in microprocessor 32. A control signal is generated by controller 10 according to whether the weight is within an acceptable range, causing motor 33 to tilt the weigh platform 1 to the right or left, after which it is returned to horizontal. Microprocessor 32 will accept operator-controlled inputs for adjusting the tilt angle and the weighing interval or duration (for example, the interval between tilting and returning to horizontal), and preferably will accumulate data on the incidence of non-conforming items adequate to detect trends. For example, in a facility manufacturing items by compression powder metallurgy, an incidence of two or three underweight items in forty might trigger an automatic increase in pressure along with a slight predetermined increase in the amount of powdered metal for each item made.

Figure 5:
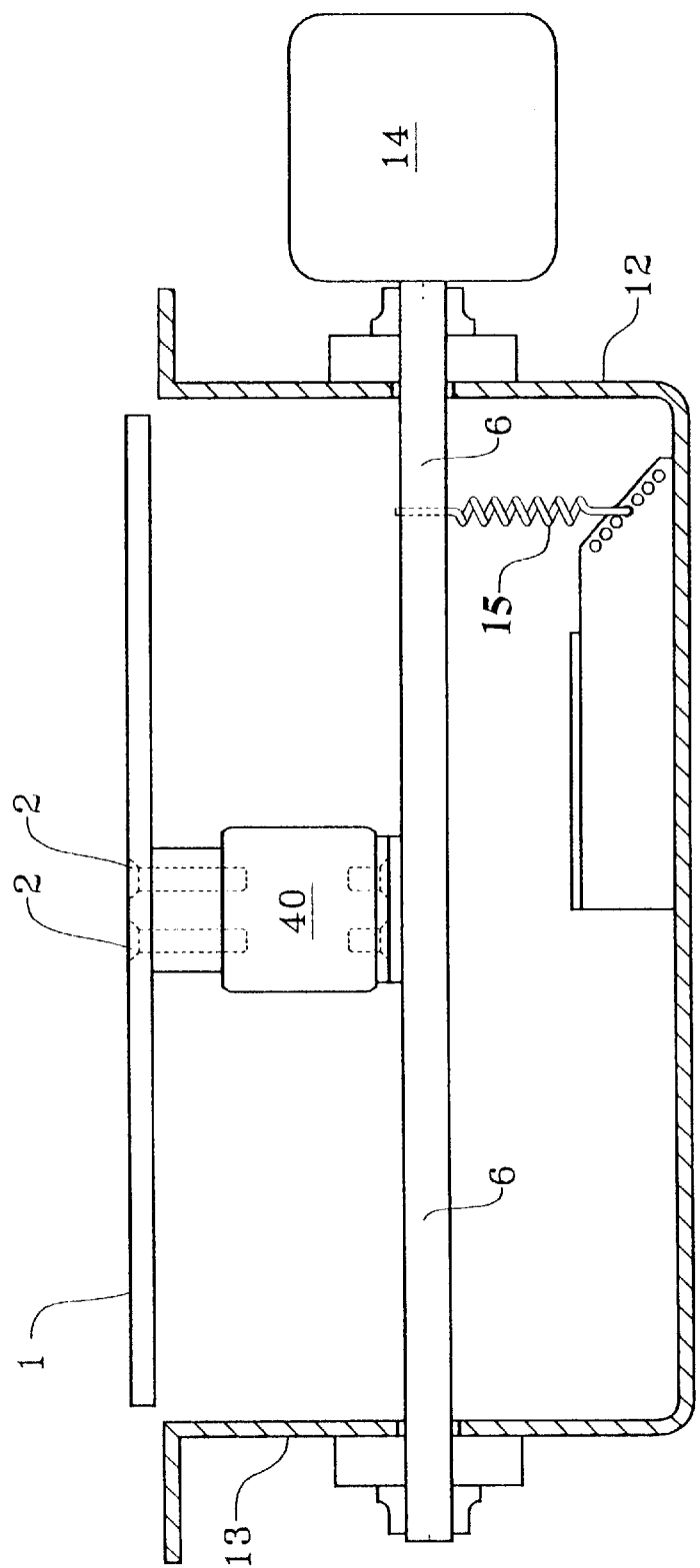
FIG. 5 shows another preferred version of my invention using a different type of load cell.

The load cell beam 3 (FIGS. 1, 2, and 3) is preferred because it is commercially available and its specifications are readily used in my system. However, it is not necessary to use a beam; rather, the load cell may be located directly under the platform and fixed to the shaft in vertical alignment so that the point of attachment to the shaft is directly under the center of the platform, as shown in FIG. 5. FIG. 5 is an alternative construction in which platform 1 is fixed to and located directly above load cell 40, which in turn is fixed to shaft 6 in vertical alignment to the center of platform 1. This requires the use of a load cell which is sensitive to downward force (as differentiated from torque stress as detected by a beam-type load cell). It will be able to compensate for placement of items to be weighed in locations not exactly in the center of platform 1. Such a load cell will detect an off-center placement of a load and compensate for a possibly unsymmetrical character of the downward force, generating an accurate weight signal in spite of placement of the item to be weighed in a location other than the center of the platform. Persons skilled in the art may consider multiple load cell or strain gauge constructions built to measure downward or gravitational forces on a plurality of points of a horizontal platform due to the non-central placement of items of the platform. My invention contemplates the use of any such strain gauges or load cells, so long as they are able to generate a signal accurately representative of the weight of the item placed on the platform.

It should be noted that the preferred constructions shown in FIGS. 1, 2, 3, and 5 utilize a load cell located substantially in the center of the platform 1 and that the shaft 6 passes substantially directly under center of platform 1 so that the axis of rotation of the assembly is under the center of the platform 1.

My invention also contemplates adjustable tilting angles and adjustable speed of tilting. These parameters may be preset in controller 10 or controlled more elaborately by microprocessor 32. Microprocessor 32 may also be programmed to detect trends in the production process such as, for example, an increase in the number of rejections over a predetermined period of time or a predetermined number of items weighed. As an example, the microprocessor or other memory device may be programmed to generate a warning signal or a control signal if more than two of the last previous 40 items were out of specification. Corrective action may then be taken manually or automatically.

Thus it is seen that my invention contemplates apparatus for accepting or rejecting items by weight comprising a substantially horizontal platform for holding items to be weighed, a beam supporting the platform at a first end, the beam including a single point load cell and being mounted on a pivot at a second end, the load cell being capable of generating a signal as a function of weight of an item on the platform, and means responsive to the signal for tilting the platform and the beam on the pivot when the item is outside of a desired weight range and returning the platform to its original substantially horizontal orientation.

My invention also includes a method of controlling quality by weight of similar items comprising placing an item in a substantially horizontal weigh area of a weigh station, weighing the item by a load cell in the weigh station and generating a signal representing the weight of the item, comparing the signal representing the weight to at least one predetermined standard therefor, generating a control signal ACCEPT or REJECT therefor, tilting the weigh area to permit gravity to remove the produced item therefrom in one direction or another according to the ACCEPT or REJECT signal, and returning the weigh area to a substantially horizontal orientation. Persons skilled in the art will recognize that the labels ACCEPT and REJECT need not be taken literally—that is, they may simply represent two different weight categories for sorting.

In addition, my invention includes apparatus for accepting or rejecting items by weight comprising a weigh station including a platform having an area for holding an item to be weighed, a load cell under the platform, the load cell being capable of generating a signal as a function of weight of an item on the platform, and a controller responsive to the signal for tilting the platform and the load cell when the item is outside of a desired weight range and returning the platform to its original orientation.

What is claimed is:

1. Checkweighing apparatus for accepting or rejecting items by weight comprising a weigh station in a fixed stationary location including a platform at said fixed stationary location having an area for holding an item to be weighed, a load cell under said platform, said load cell for generating a signal as a function of weight of an item on said platform, and a controller including a motor responsive to said signal for tilting said platform and said load cell to remove said item from said platform at said fixed stationary location when said item is outside of a desired weight range and returning said platform to its original position.

2. Apparatus of claim 1 wherein said controller includes a rotatable shaft passing substantially directly under said area for holding an item.

3. Apparatus of claim 1 wherein said controller includes a microprocesor including a trend detector for generating a signal as a function of a statistical trend of weights of successive items.

4. Apparatus of claim 3 including means responsive to said trend signal for adjusting a production step as a function thereof.

5. Checkweighing apparatus for accepting or rejecting items by weight comprising a weigh station in a fixed stationary location including a platform at said fixed stationary location having an area for holding an item to be weighed, a load cell mounted on a beam under said platform, said load cell for generating a signal as a function of weight of an item on said platform, and a controller responsive to said signal for tilting said platform and said load cell to remove said item from said platform at said fixed stationary location when said item is outside of a desired weight range and returning said platform to its original position.

6. Checkweighing apparatus for accepting or rejecting items by weight comprising a weigh station in a fixed stationary location including a platform at said fixed stationary location having an area for holding an item to be weighted, a load cell under said platform, said load cell for generating a signal as a function of weight of an item on said platform, said load cell being mounted substantially directly under its point of attachment to said platform, and a controller responsive to said signal for tilting said platform and said load cell to remove said item from said platform at said fixed stationary location when said item is outside of a desired weight range and returning said platform to its original position.

7. Weighstation apparatus for accepting or rejecting items by weight comprising (a) a substantially horizontal platform for holding items to be weighed (b) a beam supporting said platform at a first end thereof said beam including a single point load cell and being mounted on a pivot at a second end, said load cell for generating a signal as a function of weight of an item on said platform, and (c) means responsive to said signal for tilting said platform and said beam on said pivot when said item is outside of a desired weight range and returning said platform to its original substantially horizontal orientation, said platform, said beam, and said means for tilting being fixed in a stationary location.

8. Apparatus of claim 1 wherein said substantially horizontal platform comprises a substantially flat surface.

9. Apparatus of claim 1 wherein said substantially horizontal platform comprises a container designed to hold an item in a substantially fixed location with respect to said load cell.

10. Apparatus of claim 1 wherein said means for tilting said platform is a stepper motor.

11. Apparatus of claim 1 wherein said means for tilting said platform is a pneumatic cylinder.

12. Apparatus of claim 1 wherein said original substantially horizontal orientation is within 5 arc minutes of horizontal.

13. Apparatus of claim 1 having a capacity of 500 grams to 100 kilograms.

14. Apparatus of claim 1 including means responsive to said signal for tilting said platform and said beam on said pivot when said item is within said desired weight range, in a direction other than that when said item is outside said desired weight range, and returning said platform to its original substantially horizontal orientation.

* * * * *